H. S. MILLS.
STORAGE BATTERY PLATE.
APPLICATION FILED JUNE 18, 1912.
1,214,210.
Patented Jan. 30, 1917.
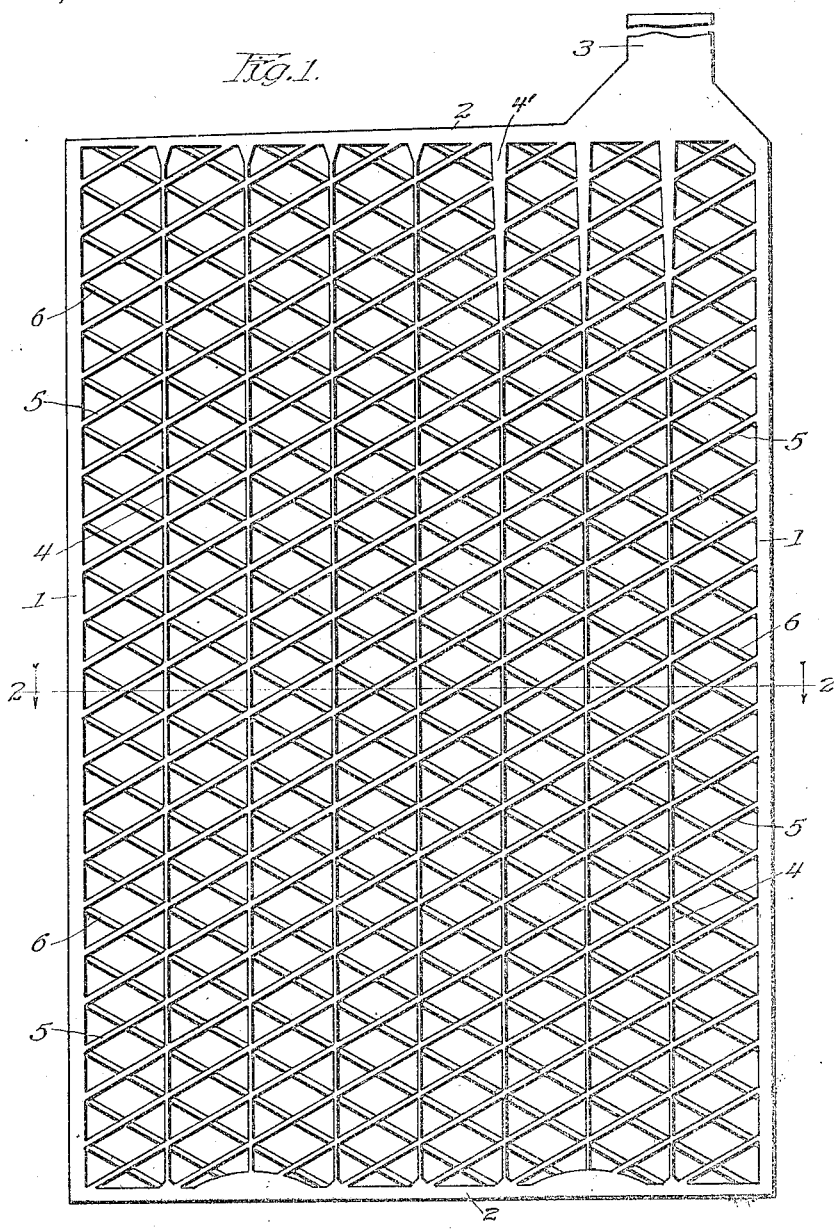
Witnesses:
Robert H. Weir
Geo. B. Jones
Inventor.
Howard Stanley Mills.
by Edwin S. Brown, Jr.
Atty.

UNITED STATES PATENT OFFICE.

HOWARD STANLEY MILLS, OF ASTORIA, NEW YORK.

STORAGE-BATTERY PLATE.

1,214,210. Specification of Letters Patent. Patented Jan. 30, 1917.

Application filed June 13, 1912. Serial No. 704,371.

*To all whom it may concern:*

Be it known that I, HOWARD STANLEY MILLS, a citizen of the United States, residing at Astoria, in the county of Queens and State of New York, have invented new and useful Improvements in Storage-Battery Plates, of which the following is a full, clear, concise, and exact description, reference being had to the accompanying drawing, forming a part of this specification.

My invention relates to storage battery plates.

One of the objects of the invention is to provide an improved conducting frame or grid for holding the lead oxid or paste used as the active material in battery plates of the pasted type.

Another object is to provide an improved battery plate of high capacity and low internal resistance, which will permit discharges at high rates with the least falling off in voltage.

A further object is to provide a battery plate having an improved distribution of conducting bars and relatively great area of contact with the electrolyte.

An additional object is to provide more avenues for the escape of gas and for the circulation of the electrolyte.

Figure 1 is an elevation of a grid which embodies the invention. Fig. 2 is a section thereof on the line 2—2 of Fig. 1. Fig. 3 is a section of a modified form of grid.

The grid shown in Figs. 1 and 2 has an outer frame of antimonious lead consisting of side bars 1 and end bars 2—2 integral therewith. A suitable terminal lug 3 of any desired configuration is provided at one end of the frame. The end bars 2 are connected by a plurality of substantially parallel equally spaced longitudinal bars or strips 4 of a width substantially equal to the thickness of the frame, as shown in Fig. 2. These strips are also made of antimonious lead and are preferably cast integral with the outer frame. The tops of several of the bars nearest to the terminal lug 3 are preferably thickened or reinforced, as shown at 4', where they join the upper cross-bar 2, and the remaining strips are also preferably reinforced to a certain extent at their upper ends. Said longitudinal strips may also be reinforced at their lower ends, if desired. The advantage of the special reinforcement of the strips adjacent to the terminal lug 3 is that the necessary strength and rigidity is provided at the point where there is greatest need for reinforcement, and at the same time the increased area of the strips provides ample current carrying capacity in the region of the terminal lug where the current is the greatest. The grid is reinforced by diagonal bars 5 and 6, all of the bars 5 being parallel to each other and cast on one side of the grid integral therewith, and all of the bars 6 being also parallel and cast integrally with the other side of the grid, the bars on one side, however, being arranged at an angle with the bars on the other side, whereby a lattice is formed. These diagonal bars act as retaining members and form small retaining frames in the shape of parallelograms, which do not come opposite each other on the two sides of the grid.

As seen in Fig. 2, the lattice bars are very fine and are spaced apart a distance nearly equal to the width of the longitudinal strips 4. With this construction the active material forced into the grid is formed as a series of continuous parallel slabs or strips, each of which extends from one end of the grid to the other without interruption. The active material, however, is prevented from falling out the side of the grid by the lattice work, and, furthermore, it is locked in position thereby. The interior of the grid being open, except for the longitudinal strips, the maximum amount of active material is retained therein. The paste being forced against such a large number of conducting bars, the conductivity of the plate as a whole is ample for the current to be carried.

In the modification shown in Fig. 3 the longitudinal strips 7 are made up of double bars spaced apart instead of extending through the plate. As a result, the active material is retained in the grid in the form of a continuous uninterrupted sheet, instead of being divided up into a plurality of parallel strips as in the first form described. The remaining elements of the grid are similar to those described in connection with Figs. 1 and 2.

In both forms of grids the maximum area of active material is exposed directly to the electrolyte, while only a relatively small amount of the lead frame is so exposed. The lead lattice work retains the active material in position and maintains proper contact therewith, at the same time constituting a conducting path to conduct current in and out of the grid with the least internal resistance. The grid is very thin, as will be seen, and as a result a large number of grids may be arranged in a given space, whereby a battery of increased capacity may be obtained. The pasted grid may be used either as a positive or negative plate, the negative plate being somewhat thinner than the positive plate.

I do not limit myself to the details of construction shown and described, as various changes may be made therein without departing from the invention as expressed in the appended claim.

What I claim as new and desire to secure by Letters Patent of the United States is:

A grid for battery plates having substantially uniform thickness throughout comprising a rectangular frame, longitudinal bars extending from end to end of said frame parallel with the longer sides thereof, said bars being flush with the opposite faces of said frame, a terminal lug for said grid adjacent the ends of certain of said longitudinal bars, said ends being thickened to provide increased electrical conductivity, and parallel cross-bars extending between adjacent longitudinal bars on each side of said grid, said cross-bars being flush with the surfaces of said longitudinal bars, the bars on opposite sides extending in different diagonal directions and the bars on opposite sides being spaced apart, whereby receptacles for active material are provided which extend continuously from end to end of said grid between said longitudinal bars, said diagonal bars serving as retaining means for said active material.

In witness whereof, I have hereunto subscribed my name in the presence of two witnesses.

HOWARD STANLEY MILLS.

Witnesses:
ROBERT CLOHESSY,
M. SCHAVEL.